United States Patent
Kitajima

(10) Patent No.: US 9,602,709 B2
(45) Date of Patent: Mar. 21, 2017

(54) IMAGE PICKUP APPARATUS, CONTROL METHOD OF IMAGE PICKUP APPARATUS, AND PROGRAM

(71) Applicant: CANON KABUSHIKI KAISHA, Tokyo (JP)

(72) Inventor: Kotaro Kitajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/141,967

(22) Filed: Dec. 27, 2013

(65) Prior Publication Data

US 2014/0184825 A1 Jul. 3, 2014

(30) Foreign Application Priority Data

Dec. 28, 2012 (JP) ................. 2012-288034

(51) Int. Cl.
 *H04N 5/232* (2006.01)
 *G11B 27/30* (2006.01)
 *H04N 9/67* (2006.01)

(52) U.S. Cl.
 CPC ..... *H04N 5/23206* (2013.01); *G11B 27/3027* (2013.01); *H04N 9/67* (2013.01)

(58) Field of Classification Search
 CPC .... H04N 5/772; H04N 9/8042; H04N 9/8205; H04N 9/68; H04N 9/69; H04N 1/00204; H04N 1/32561; H04N 1/6077; H04N 1/608; H04N 9/735; G09G 2320/0666
 See application file for complete search history.

(56) References Cited

U.S. PATENT DOCUMENTS

| | | | |
|---|---|---|---|
| 6,650,365 B1 * | 11/2003 | Sato | H04N 1/32112 348/231.3 |
| 2005/0055727 A1 * | 3/2005 | Creamer et al. | 725/105 |
| 2008/0122949 A1 * | 5/2008 | Kindborg et al. | 348/231.99 |

FOREIGN PATENT DOCUMENTS

JP 2009-021827 A 1/2009

* cited by examiner

*Primary Examiner* — Christopher K Peterson
(74) *Attorney, Agent, or Firm* — Cowan, Liebowitz & Latman, P.C.

(57) ABSTRACT

A control method of an image pickup apparatus has: an output step of outputting a photographed image to an external image processing apparatus; a transmission step of transmitting a transmission request of parameter information of an image processing to the photographed image which is generated by the external image processing apparatus, to the external image processing apparatus; a receiving step of receiving the parameter information from the external image processing apparatus; a recording step of recording the received parameter information in relation the photographed image; a detection step of detecting an operation in the image pickup apparatus; and a control step of executing a processing for transmitting the transmission request of the parameter information to the external image processing apparatus in the transmission step when the predetermined operation is detected in the detection step.

16 Claims, 15 Drawing Sheets

CDL MANAGEMENT INFORMATION FOR EVERY CLIP

| CLIP No. | COLOR GRADING PARAMETER (CDL) |
|---|---|
| 0001 | 1.2, 1.2, 1.2, 0.1, 0.1, 0.1, 1.0, 1.0, 1.0 |
| 0002 | 1.2, 1.2, 1.2, 0.1, 0.1, 0.1, 1.0, 1.0, 1.0 |
| 0003 | 1.2, 1.2, 1.2, 0.0, 0.0, 0.0, 1.1, 1.1, 1.1 |
| 0004 | NOT OBTAINED |
| 0005 | NOT OBTAINED |
| 0006 | NOT OBTAINED |
| | |

FIG. 14A

CDL MANAGEMENT INFORMATION OF EACH CLIP

| CLIP No. | CDL_ID |
|---|---|
| 0001 | 001 |
| 0002 | 001 |
| 0003 | 002 |
| 0004 | 003 |
| 0005 | 003 |
| 0006 | 004 |
|  |  |

FIG. 14B

CDL_ID MANAGEMENT INFORMATION

| CDL_ID | CDL DATA |
|---|---|
| 001 | 1.2, 1.2, 1.2, 0.1, 0.1, 0.1, 1.0, 1.0, 1.0 |
| 002 | 1.2, 1.2, 1.2, 0.0, 0.0, 0.0, 1.1, 1.1, 1.1 |
| 003 | 1.4, 1.4, 1.4, 0.2, 0.2, 0.2, 0.9, 0.9, 0.9 |
| 004 | NOT OBTAINED |

IMAGE PICKUP APPARATUS, CONTROL METHOD OF IMAGE PICKUP APPARATUS, AND PROGRAM

BACKGROUND OF THE INVENTION

Field of the Invention

The present invention relates to an image pickup apparatus such as, for example, digital camera, digital video camera, or the like, a control method of the image pickup apparatus, and a program.

Description of the Related Art

In a production site of a digital cinema or the like, generally, a color grading processing for revising an image photographed by an image pickup apparatus such as a digital video camera or the like to a desired image is executed together with a cut editing. The color grading processing is executed by using a color grading apparatus in an editing studio or the like after the photographing.

On the other hand, there is also a case where in a photographing site, a provisional color grading processing is preliminarily executed to a photographed image and, after the photographing, a main color grading processing serving as a fine adjustment is executed in an editing studio. By previously executing the provisional color grading processing to the photographed image in the photographing site as mentioned above, an impression of a final finish can be grasped at the time of photographing and a burden of the main color grading processing after the photographing can be reduced.

Such a technique that the provisional color grading processing is executed in an image pickup apparatus such as a digital camera or the like at the time of photographing is proposed (refer to the Official Gazette of Japanese Patent Application Laid-Open No. 2009-21827). However, in the case where the provisional color grading processing is executed in the image pickup apparatus, since there is a limitation in a processing ability, only a rough processing can be executed and a burden of the main color grading processing after the photographing cannot be sufficiently reduced.

Therefore, if it is necessary to execute the finer provisional color grading processing, it is executed by using an external provisional color grading apparatus of the image pickup apparatus. In this case, the image pickup apparatus such as a digital video camera or the like outputs an image to the external provisional color grading apparatus through an HD-SDI cable or the like. The provisional color grading apparatus executes the provisional color grading processing to the image which is output from the image pickup apparatus and records parameters of the provisional color grading.

In a main color grading apparatus, a processing based on the recorded parameters of the provisional color grading is executed to the photographed image, thereby reproducing a provisional color grading result at the time of photographing and a fine adjustment is performed to the image obtained after the provisional color grading. Thus, the burden of the main color grading processing after the photographing can be reduced.

However, in the case of executing the provisional color grading processing by using the external provisional color grading apparatus of the image pickup apparatus, the parameters of the provisional color grading are recorded separately from the image photographed by the image pickup apparatus. Therefore, in the main color grading processing, it is difficult to provide appropriate correspondence between process the photographed image and the parameters of the provisional color grading.

SUMMARY OF THE INVENTION

It is, therefore, an aspect of the invention to provide a technique which can record parameter information of an image processing to a photographed image generated by an external image processing apparatus and an image photographed by an image pickup apparatus in appropriate relation to each other.

To accomplish the above aspect, according to the invention, an image pickup apparatus comprises: an image pickup unit configured to pick up an image of an object; an output unit configured to output the photographed image picked up by the image pickup unit to an external image processing apparatus; a transmission unit configured to transmit a transmission request of parameter information of an image processing to the photographed image which is generated by the external image processing apparatus, to the external image processing apparatus; a receiving unit configured to receive the parameter information from the external image processing apparatus; a recording unit configured to record the parameter information received by the receiving unit in relation to the photographed image; an operation detection unit configured to detect an operation in the image pickup apparatus; and a control unit configured to control the transmission of the transmission request of the parameter information by the transmission unit, wherein the control unit controls the transmission unit so as to transmit the transmission request of the parameter information to the external image processing apparatus when the operation detection unit detects the predetermined operation.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 14A and 14B are diagrams illustrating an example of CDL management information and management information of CDL_ID for every clip, respectively.

DESCRIPTION OF THE EMBODIMENTS

Various exemplary embodiments, features, and aspects of the present invention will be described in detail below with reference to the drawings.

First Embodiment

Figure 1:
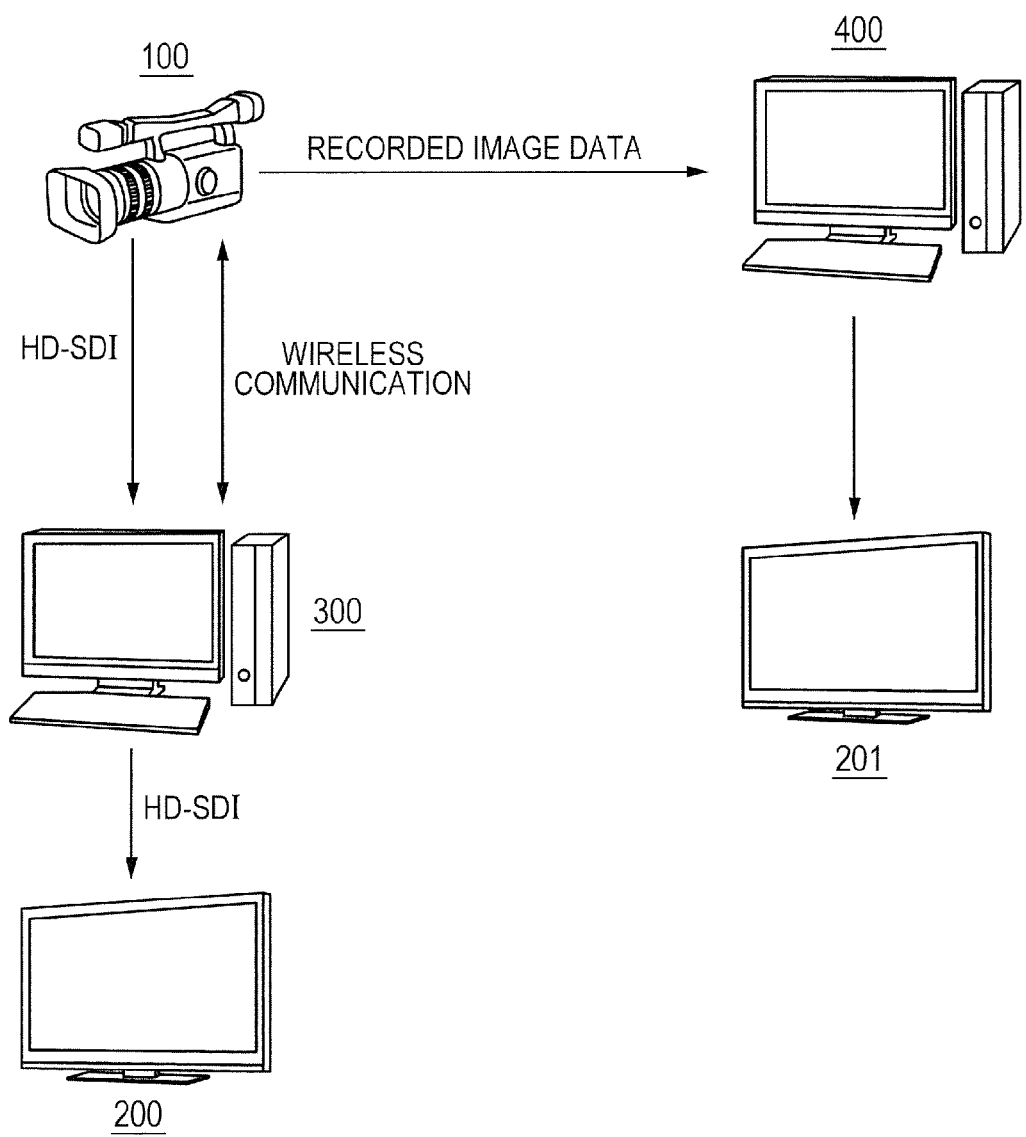
FIG. 1 is a diagram illustrating an example of a construction of an image processing system having a digital video camera according to the first embodiment of an image pickup apparatus of the invention.

FIG. 1 is a diagram illustrating an example of a construction of an image processing system having a digital video camera according to the first embodiment of an image pickup apparatus of the invention.

In FIG. 1, a digital camera 100 (hereinbelow, referred to as a camera 100) picks up an image of an object, records the photographed image into a recording medium 112 (refer to FIG. 2), and outputs the image which is being photographed to a provisional color grading apparatus 300 by wireless communication or the like.

The provisional color grading apparatus 300 executes a provisional color grading processing such as a correction of color and brightness and the like to the image under photographing which is output from the camera 100 to provisionally adjust an appearance of the image, and outputs the image obtained after the provisional adjustment to an external monitor 200. The provisional color grading apparatus 300 corresponds to an example of an external image processing apparatus of the invention.

A main color grading apparatus 400 reads out image data of the photographed image from the recording medium 112 after completion of the photographing by the camera 100. On the basis of provisional color grading information which is generated by the provisional color grading apparatus 300 and will be described hereinafter, the main color grading apparatus 400 executes substantially the same processing as the provisional color grading to the image data which is read out from the recording medium 112. Further, the main color grading apparatus 400 executes a main color grading processing to the image data obtained after substantially the same processing as the provisional color grading is performed, to fully adjust the appearance of the image, and outputs the image obtained after the adjustment to an external monitor 201.

Figure 2:
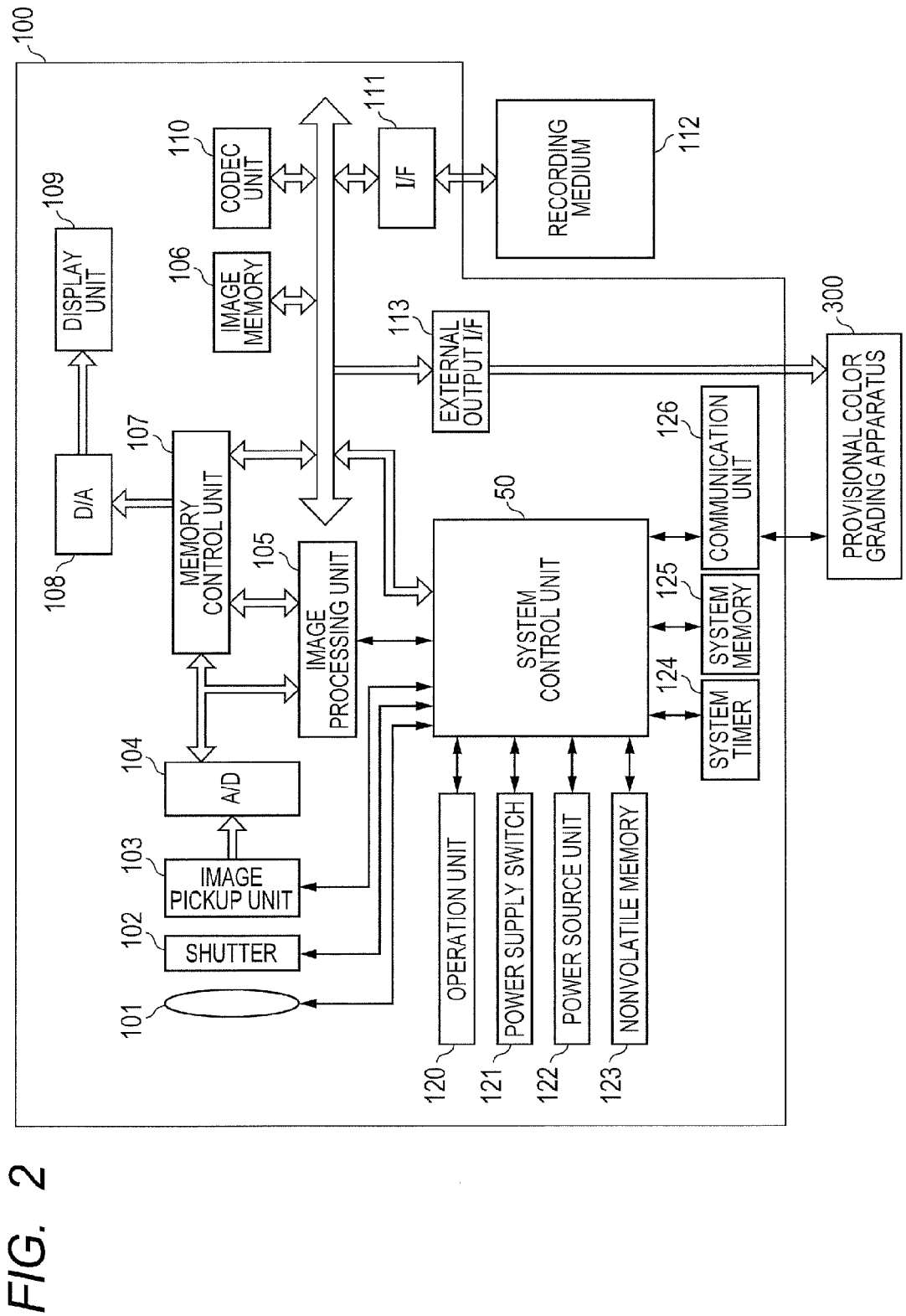
FIG. 2 is a block diagram illustrating an example of a construction of the digital video camera.

FIG. 2 is a block diagram illustrating an example of a construction of the camera 100. In FIG. 2, a system control unit 50 controls the whole camera 100 and receives inputs from a power supply switch 121, an operation unit 120, and the like. A power source unit 122 supplies a power source to the system control unit 50. A system timer 124 measures a time which is used for various kinds of control and a time of a built-in clock. A system memory 125 develops constants and variables for operation of the system control unit 50, a program read out from a nonvolatile memory 123, and the like. A communication unit 126 makes communication with an external apparatus in a wireless manner.

An image pickup unit 103 is constructed by a CCD sensor, a CMOS sensor, or the like, photoelectrically converts object light which entered through a lens group 101 including a zoom lens and a focus lens and a shutter 102 having an iris function, and outputs as an image signal to an A/D converter 104. The A/D converter 104 converts an analog image signal which is output from the image pickup unit 103 into a digital image signal and outputs to an image processing unit 105.

The image processing unit 105 executes a color conversion processing such as white balance (WB) or the like, a gamma processing, and the like to the image data which is output from the A/D converter 104 or image data which is read out from a memory control unit 107. The image processing unit 105 also executes a predetermined arithmetic operation processing by using the image data of the photographed image. On the basis of an obtained arithmetic operation result, exposure control and distance measurement control are executed by the system control unit 50. Thus, an AF (Auto-Focus) processing of a TTL (Through-The Lens) method, an AE (Auto-Exposure) processing, and the like are executed. Further, the image processing unit 105 estimates a light source by a processing, which will be described hereinafter, by using the image data of the photographed image and also executes an AWB (Auto-White Balance) processing on the basis of the estimated light source.

The image data which is output from the image processing unit 105 is written into an image memory 106 through the memory control unit 107. The image memory 106 stores the image data which is output from the image pickup unit 103 or image data to be displayed to a display unit 109. An external output I/F 113 outputs the image data stored in the image memory 106 to the external provisional color grading apparatus 300. A D/A converter 108 converts the data for image display stored in the image memory 106 into an analog image signal and supplies to the display unit 109. The display unit 109 displays an image corresponding to the analog image signal supplied from the D/A converter 108 onto a display panel such as an LCD (Liquid Crystal Display) or the like.

A codec unit 110 compression-codes the image data recorded in the image memory 106 on the basis of a standard such as MPEG or the like. The system control unit 50 stores the coded image data or non-compressed image data into the recording medium 112 such as memory card, hard disk, or the like through a recording I/F 111.

The system control unit 50 executes each processing in the embodiment, which will be described hereinafter, by executing the program recorded in the nonvolatile memory 123 such as an EEPROM or the like. At this time, the constants and variables for operation of the system control unit 50, the program read out from the nonvolatile memory 123, and the like are developed into the system memory 125.

Figure 3:
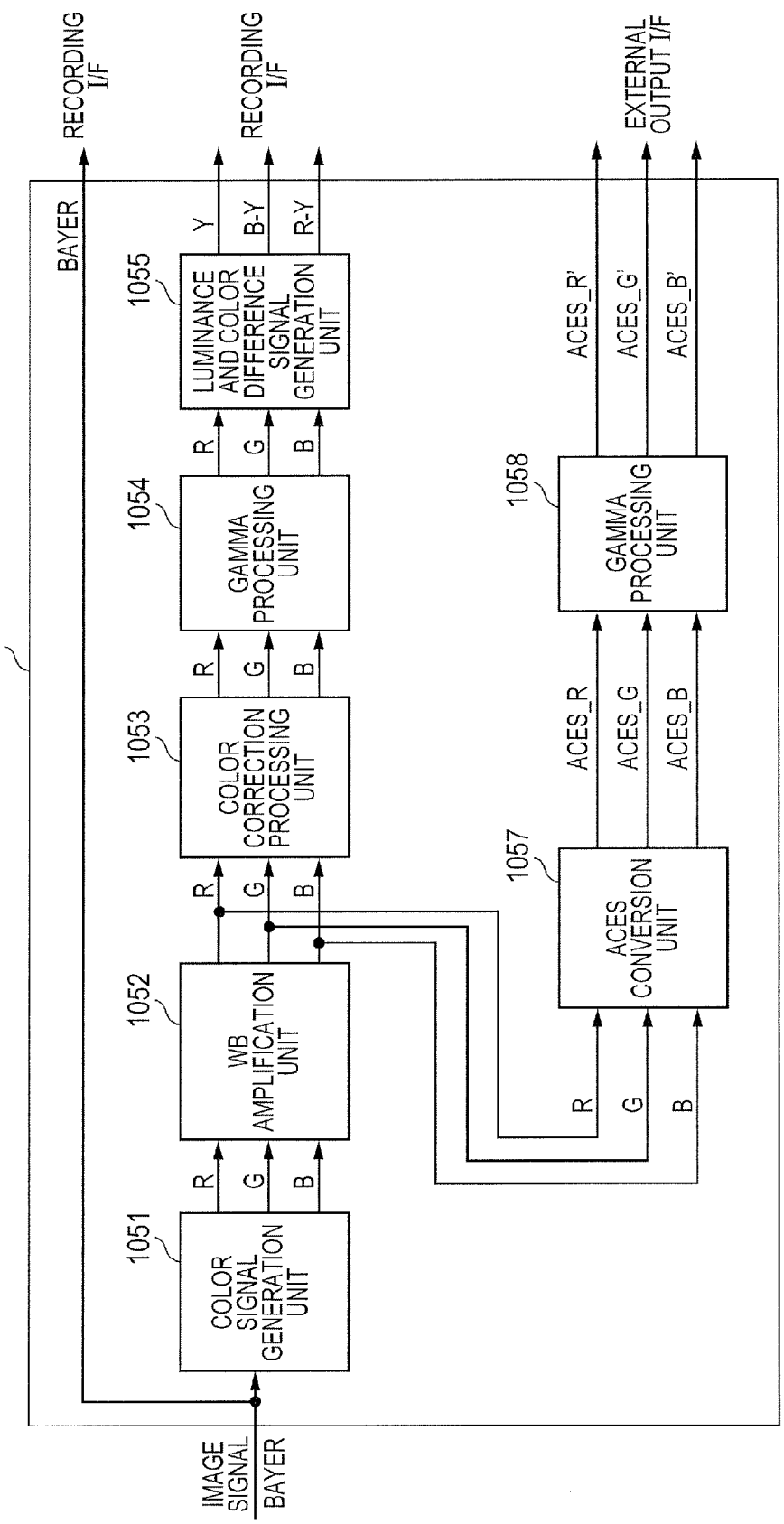
FIG. 3 is a block diagram illustrating an example of a construction of an image processing unit of the digital video camera.

The image processing unit 105 in the camera 100 will be described in detail with reference to FIG. 3. FIG. 3 is a block diagram illustrating an example of a construction of the image processing unit 105.

As illustrated in FIG. 3, the image processing unit 105 has a color signal generation unit 1051, a WB amplification unit 1052, a color correction processing unit 1053, a gamma processing unit 1054, a luminance and color difference signal generation unit 1055, an ACES conversion unit 1057, and a gamma processing unit 1058.

The image signal which is output from the A/D converter 104 is of an RAW type of Bayer RGB. In the case of recording the image while keeping the Bayer RGB image signal, the image processing unit 105 outputs the Bayer RGB image signal as it is to the recording medium 112 through the recording I/F 111. At the same time, in the image processing unit 105, the Bayer RGB image signal is input to the color signal generation unit 1051.

By executing a coincidence processing to the image data of Bayer RGB which is input, the color signal generation unit 1051 generates color signals R, G, and B and outputs the generated color signals RGB to the WB amplification unit 1052.

The WB amplification unit 1052 adjusts a white balance by multiplying the color signals RGB by a gain on the basis of a white balance gain value which is calculated by the system control unit 50. The color correction processing unit 1053 corrects a color tone by executing a matrix processing of 3×3 and a 3-dimensional LUT (LookUp Table) processing to the color signals of RGB.

The gamma processing unit 1054 performs such a gamma correction that the input color signals of RGB are multiplied by a gamma according to the standard such as Rec.709 or the like or a gamma of a logarithm format, or the like. The luminance and color difference signal generation unit 1055 generates a luminance signal Y and color difference signals R-Y and B-Y from the RGB signals and outputs the generated luminance signal Y and color difference signals R-Y and B-Y to the external output I/F 113 and the recording I/F 111.

The ACES conversion unit 1057 converts the RGB image signals which are output from the WB amplification unit 1052 into RGB image signals according to the ACES (Academy Color Encode Specification) standard proposed by AMPAS (Academy of Motion Picture Arts and Science).

Specifically speaking, the ACES conversion unit 1057 executes an IDT (Input Device Transform) processing in the ACES standard. The IDT processing is a processing including a correction processing of a color reproducibility and a conversion processing of a color space. The ACES conversion unit 1057 outputs the generated ACES_RGB image signals to the gamma processing unit 1058. The RGB image signals of the ACES standard have linearity with respect to the object brightness and have characteristics having a color reproducibility which is faithful to the object.

The gamma processing unit 1058 executes the gamma processing for multiplying the RGB image data of the ACES standard by the gamma of the logarithm format and outputs ACES image signals (ACES_R'G'B') obtained after the gamma processing to the external output I/F 113.

The recording I/F 111 controls a signal of communication with the recording medium 112 and outputs the input image signals to the recording medium 112. In the embodiment, the image data which is recorded into the recording medium 112 is the foregoing Bayer RGB image data or the luminance signal Y and color difference signals R-Y and B-Y.

The external output I/F 113 converts the ACES image signals after the gamma processing, which are output from the gamma processing unit 1058 of the image processing unit 105, into a format in which they can be transmitted as HS-SDI signals and outputs to the provisional color grading apparatus 300.

Figure 4:
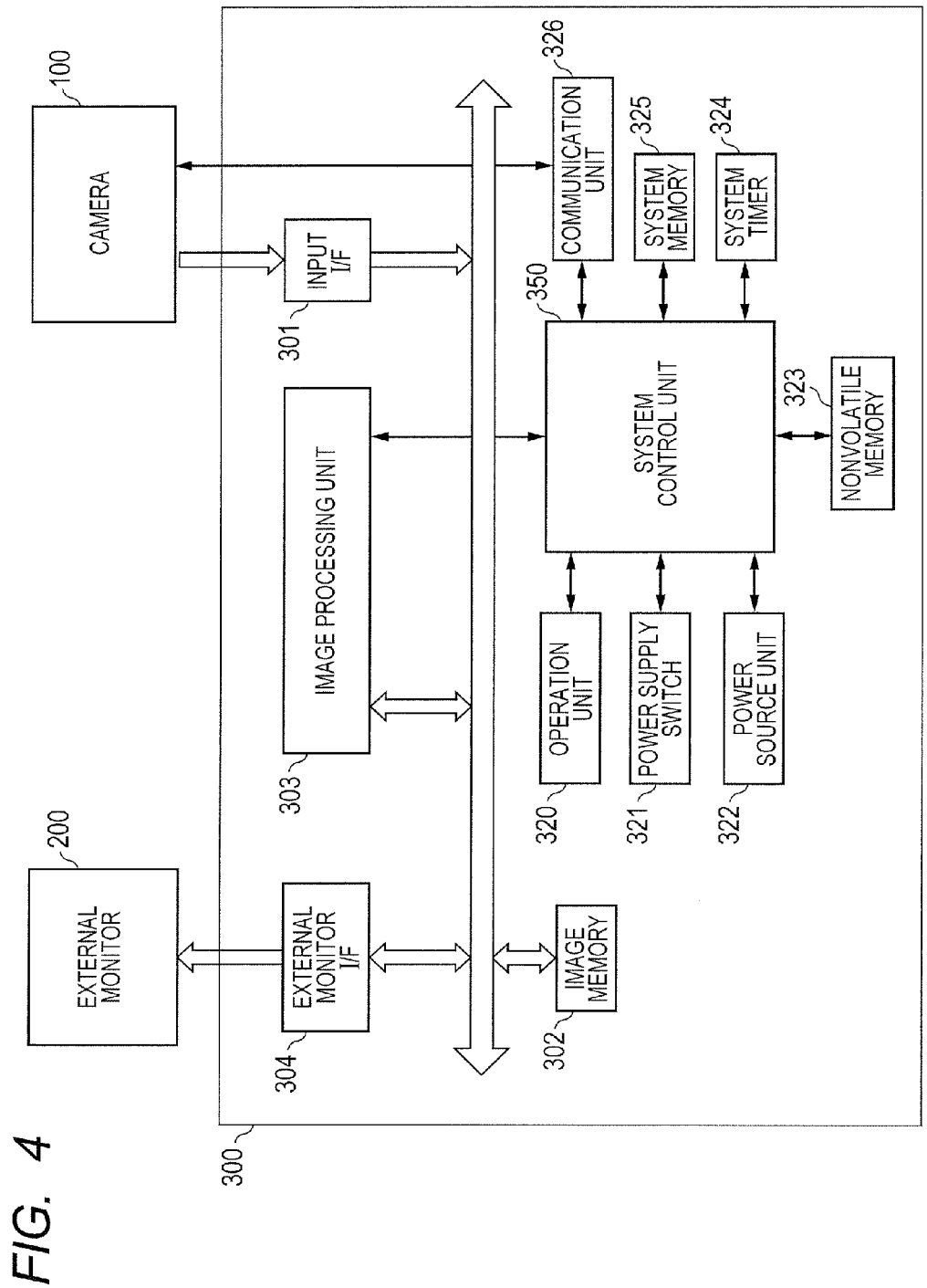
FIG. 4 is a block diagram illustrating an example of a construction of a provisional color grading apparatus.

FIG. 4 is a block diagram illustrating an example of a construction of the provisional color grading apparatus 300. In FIG. 4, a system control unit 350 controls the whole provisional color grading apparatus 300 and receives inputs from a power supply switch 321, an operation unit 320, and the like. The operation unit 320 is constructed by a mouse, a keyboard, a touch panel, or the like. A power source unit 322 supplies electric power to the system control unit 350.

A system timer 324 measures a time which is used for various kinds of control and a time of a built-in clock. A system memory 325 develops constants and variables for operation of the system control unit 350, a program read out from a nonvolatile memory 323, and the like. A communication unit 326 makes communication with an external apparatus such as a camera 100 or the like in a wireless manner. An input I/F 301 receives the image signal which is output from the camera 100. An image processing unit 303 executes various kinds of image processings such as color conversion, gradation conversion, and the like.

When the image signal which is output through the external output I/F 113 of the camera 100 is received by the input I/F 301, the system control unit 350 records the received image signal into an image memory 302. Subsequently, the system control unit 350 determines parameters of the image processing unit 303 by the user operation and control, which will be described hereinafter, and sets the parameters into the image processing unit 303.

The image processing unit 303 executes an image processing including the provisional color grading processing to the image in accordance with the parameters set by the system control unit 350, and records a result of the image processing into the image memory 302. The system control unit 350 reads out the image obtained after the provisional color grading processing from the image memory 302 and outputs to the external monitor 200 through an external monitor I/F 304.

Figure 5:
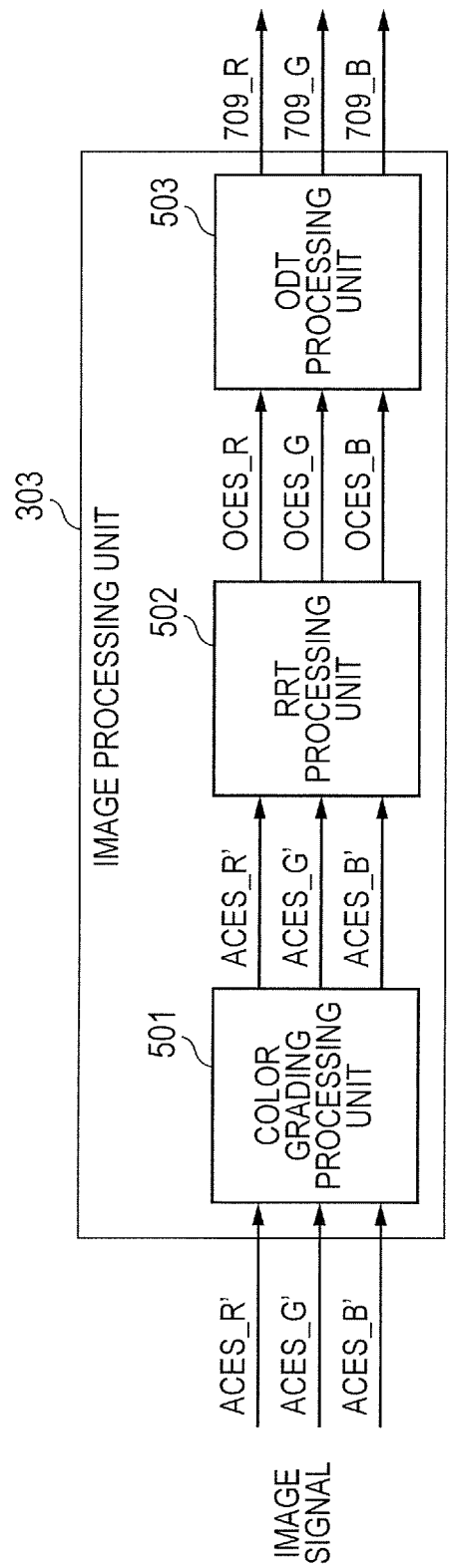
FIG. 5 is a block diagram illustrating an example of a construction of an image processing unit of the provisional color grading apparatus.

The image processing unit 303 in the provisional color grading apparatus 300 will be described in detail with reference to FIG. 5. FIG. 5 is a block diagram illustrating an example of a construction of the image processing unit 303.

As illustrated in FIG. 5, the image processing unit 303 has a color grading processing unit 501, an RRT processing unit 502, and an ODT processing unit 503.

The ACES_RGB image signals after the gamma processing which are output from the camera 100 are input to the color grading processing unit 501. The color grading processing unit 501 executes the color grading processing according to an input by the user operation. In this instance, as contents of the color grading processing, a color grading which can be described by a CDL defined by ASC (The American Society Of Cinematographers) is used as an example.

The color grading in the CDL format can be expressed by Out=(slope×In +offset)$_{power}$ assuming that an input to the color grading processing unit 501 is expressed by "In" and an output is expressed by "Out".

In this instance, "slope", "offset", and "power" are parameters of the color grading. The system control unit 350 receives the user operation to the operation unit 320 and sets the parameters (slope, offset, power) into the image processing unit 303. The color grading processing unit 501 outputs the ACES_RGB image data after the color grading processing to the RRT processing unit 502.

The RRT processing unit 502 executes an RRT (Reference Rendering Transform) processing defined by the ACES standard. Specifically speaking, the RRT processing unit 502 executes an adjustment of such color tone and gamma that provide an appearance of a film tone. The data obtained after the RRT processing is called OCES_RGB image data. The RRT processing unit 502 outputs the OCES_RGB image data after the RRT processing, to the ODT processing unit 503.

The ODT processing unit 503 executes an ODT (Output Device Transform) processing of the ACES standard. Specifically speaking, the ODT processing unit 503 executes a conversion of a gamma and a color gamut according to standard characteristics of a monitor on the output destination side. In the present embodiment, a case where the external monitor 200 connected to the provisional color grading apparatus 300 is a monitor of the Rec.709 standard will be described as an example. In this case, the ODT processing unit 503 converts the input signals so as to fall within the color gamut of Rec.709 and executes the gamma processing of the Rec.709 standard. The ODT processing unit 503 outputs the image signals after the conversion (709_RGB signals) to the external monitor 200 through the external monitor I/F 304.

By a combination of the foregoing camera 100, provisional color grading apparatus 300, and external monitor 200, the user can execute such a provisional color grading processing that the image displayed on the external monitor 200 approaches a desired appearance at the time of photographing.

Subsequently, such a processing that the camera 100 and the provisional color grading apparatus 300 communicate with each other and transmit and receive the parameter information of the color grading will be described.

Figure 6:
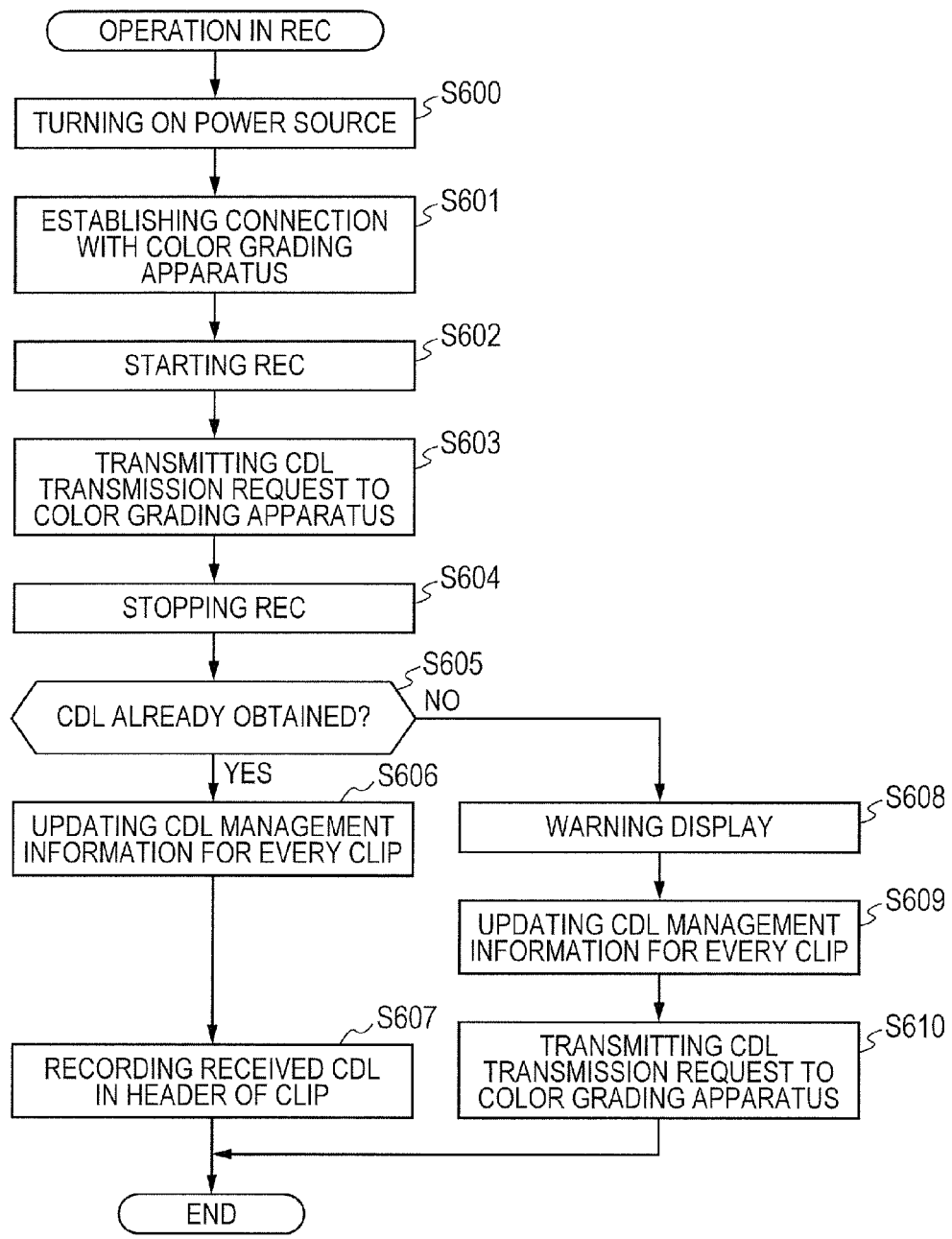
FIG. 6 is a flowchart for describing an example of the operation within a range from an activation of a power source to a recording of a photographed image in the digital video camera.

First, the operation of the camera 100 will be described with reference to FIG. 6. FIG. 6 is a flowchart for describing an example of the operation from the activation of the power source to the recording of the photographed image in the camera 100. In the processing in FIG. 6, the program or the like stored in the nonvolatile memory 123 of the camera 100 is developed in the system memory 125 and is executed by the system control unit 50.

In FIG. 6, in step S600, when the power supply switch 121 is turned on by the user operation, the system control unit 50 activates the camera 100 and advances to step S601.

In step S601, the system control unit 50 controls so as to establish communication with the provisional color grading apparatus 300 through the communication unit 126. The system control unit 50 outputs the photographed image signals (ACES_RGB image signals after the gamma processing) to the provisional color grading apparatus 300 through the external output I/F 113 and advances to step S602. At this time, from the provisional color grading apparatus 300, the system control unit 50 obtains information for discriminating whether or not the output photographed image signals are input to the provisional color grading apparatus 300.

In step S602, when a recording start input of the photographed image in the operation unit 120 by the user operation is received, the system control unit 50 starts the recording operation of the photographed image. Specifically speaking, the system control unit 50 controls in such a manner that the luminance signal Y and the color difference signals R-Y and B-Y generated by the luminance and color difference signal generation unit 1055 of the image processing unit 105 are compression-coded by the codec unit 110 and are recorded into the recording medium 112 through the recording I/F 111. The system control unit 50 functions as an example of an operation detection unit of the invention, detects the start of the recording operation of the photographed image, and advances to step S603.

In step S603, the system control unit 50 transmits a transmission request of information in the CDL format as parameters of the color grading to the provisional color grading apparatus 300 through the communication unit 126 and advances to step S604. However, such a processing is executed only in the case where it is determined that the output photographed image is input to the provisional color grading apparatus 300 by using the information obtained in S601 and showing a discrimination result about whether or not the output photographed image from the camera 100 is input to the provisional color grading apparatus 300.

In the present embodiment, as mentioned above, since the color grading processing which can be described in the CDL format is executed in the provisional color grading apparatus 300, the information in the CDL format is requested as color grading parameters. The information in the CDL format is numeric information (hereinbelow, referred to as CDL parameter information) in which the foregoing parameters (slope, offset, power) are provided for each of RGB.

In step S604, when a recording stop input in the operation unit 120 by the user operation is received, the system control unit 50 stops the recording operation of the photographed image and advances to step S605.

In step S605, the system control unit 50 discriminates whether or not the CDL parameter information is obtained from the provisional color grading apparatus 300 at a point of time of the stop of the recording operation of the photographed image. If the CDL parameter information is obtained, the system control unit 50 advances to step S606. If it is not obtained yet, S608 follows.

In step S606, the system control unit 50 updates the CDL management information for every clip and advances to step S607.

Figures 7, 8:
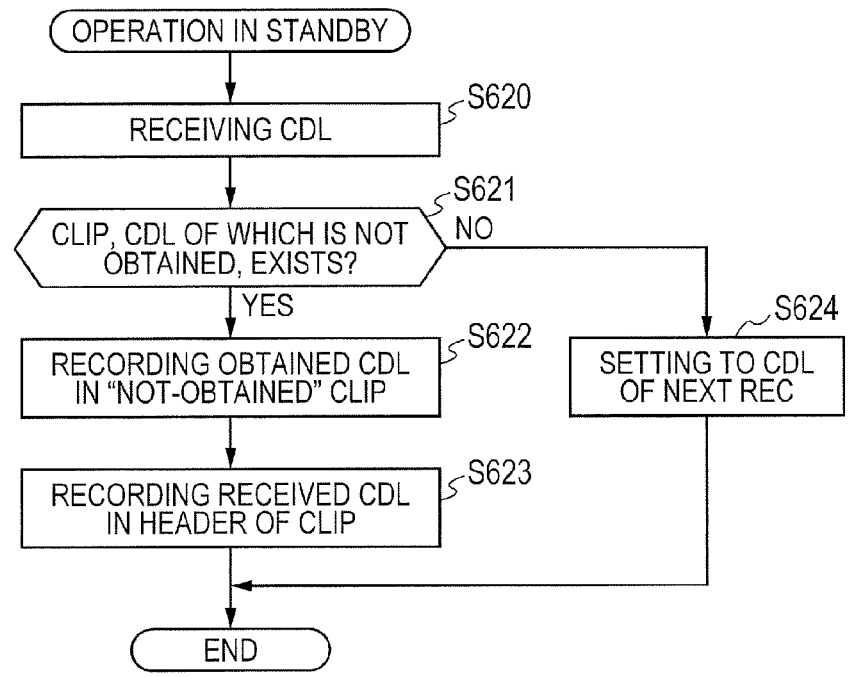
FIG. 7 is a flowchart for describing an example of the operation at the time of the standby operation between the photographing and the photographing in the digital video camera.
FIG. 8 is a diagram for describing CDL (Color Decision List) parameter information for every clip.

The CDL parameter information for every clip will now be described with reference to FIG. 8. "clip" mentioned here denotes a file which is formed by the photographing of one time (from the recording to the stop thereof). The system control unit 50 allocates an ID to the clip at the time of photographing and obtains the CDL parameter information from the provisional color grading apparatus 300 through the communication unit 126. As shown in FIG. 8, the system control unit 50 manages the ID allocated to the clip and the CDL parameter information obtained from the provisional color grading apparatus 300 in relation to each other.

That is, in the case where a new photographed image is recorded and a new clip is generated, the system control unit 50 generates a new clip ID. At that timing, the system control unit 50 records the CDL parameter information obtained from the provisional color grading apparatus 300 into the system memory 125 in relation to the clip ID.

Returning to FIG. 6, in step S607, the system control unit 50 records the CDL parameter information related to the ID of the clip into a header portion of the clip as meta data (additional information) and finishes the processing.

Figure 9:
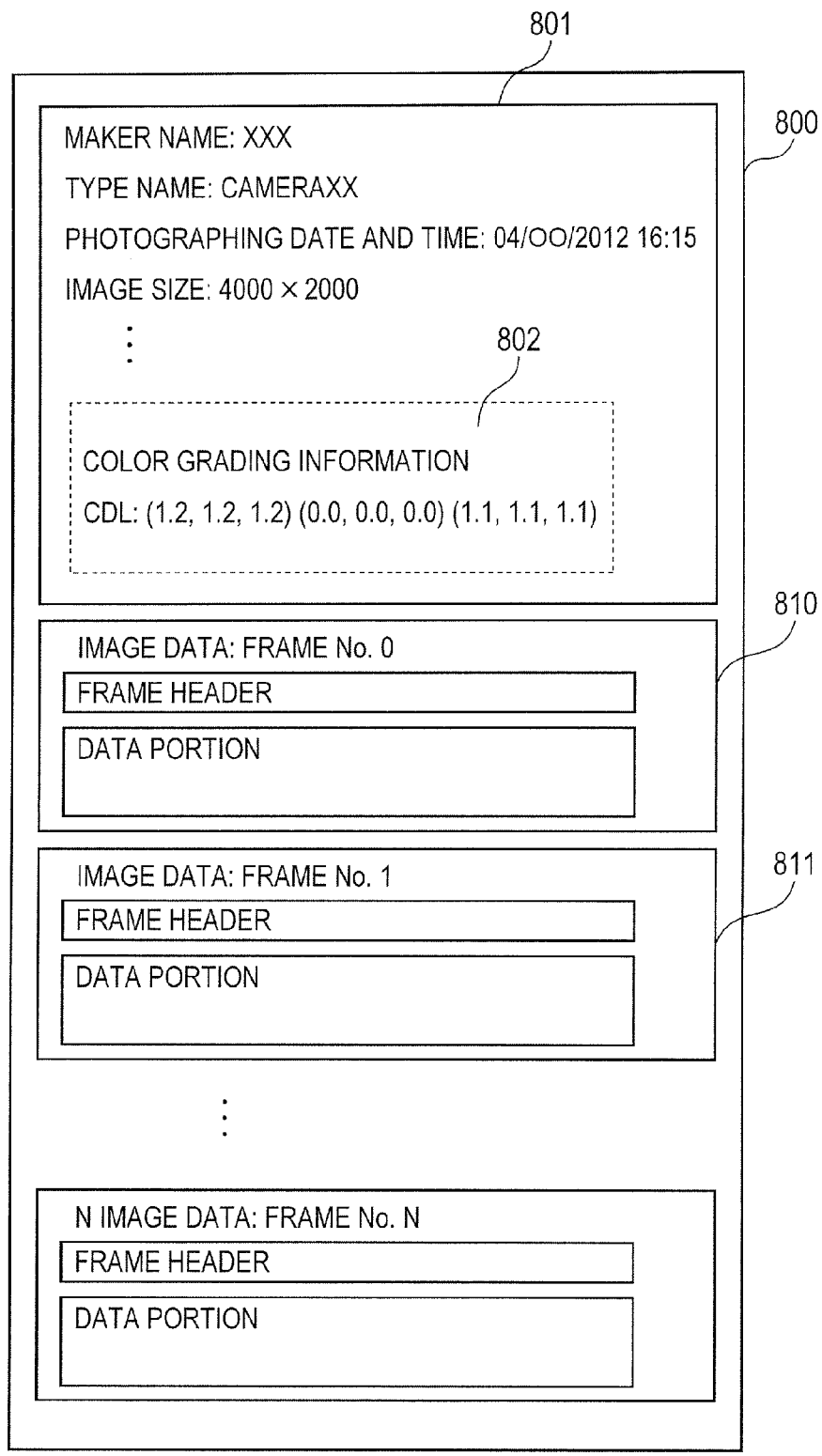
FIG. 9 is a diagram illustrating an example of meta data which is recorded in a header portion of a clip (image file).

FIG. 9 is a diagram illustrating an example of meta data 801 which is recorded into the header portion of a clip (image file 800). As illustrated in FIG. 9, the meta data 801 and image frame data 810 and 811 are recorded in the clip (image file 800). The meta data 801 is recorded in the header portion of the clip (image file 800). CDL parameter information 802 is recorded as a part of the meta data 801.

In step S608, the system control unit 50 performs a warning display to notify the user that the CDL parameter information is not obtained yet from the provisional color grading apparatus 300, and advances to step S609. Specifically speaking, the system control unit 50 generates an image of the warning display, multiplexes to the image signals, and outputs to the external monitor 200.

Figure 10:
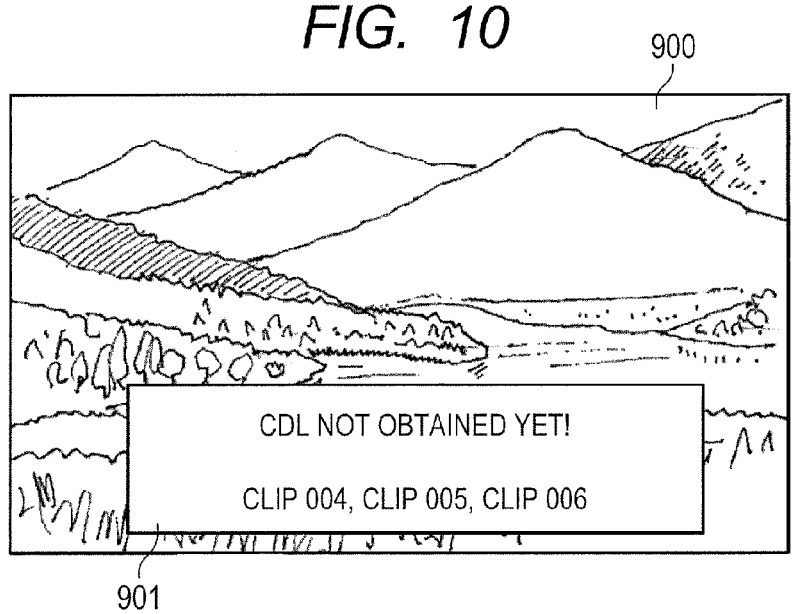
FIG. 10 is a diagram illustrating an example of a warning image which is displayed on an external monitor.

FIG. 10 is a diagram illustrating an example of a warning image which is displayed on the external monitor 200. As illustrated in FIG. 10, a photographed image 900 and a warning image 901 are displayed on the external monitor 200. Together with text information to notify the user that the CDL parameter information is not obtained yet, the ID of the clip to which the CDL parameter information is not related is also displayed in the warning image 901.

Returning to FIG. 6, in step S609, the system control unit 50 updates CDL management information (FIG. 8) for every clip and advances to step S610. As for the processing here, since the CDL parameter information to be related to the clip is not obtained yet, information showing that the CDL parameter information is "not obtained" yet is recorded in the CDL management information like in a case where the IDs of the clips shown in FIG. 8 are equal to 0004, 0005, and 0006.

In step S610, the system control unit 50 transmits the transmission request of the CDL parameter information to the provisional color grading apparatus 300 through the communication unit 126 and finishes the processing.

Subsequently, an example of the operation at the time of the standby operation between photographings in the camera 100 will be described with reference to FIG. 7. Each processing in FIG. 7 is executed by a method whereby the program or the like stored in the nonvolatile memory 123 in the camera 100 is developed in the system memory 125 and is executed by the system control unit 50.

In FIG. 7, in step S620, the system control unit receives the CDL parameter information from the provisional color grading apparatus 300 through the communication unit 126 and advances to step S621. The reception of the CDL parameter information in this instance is a reception of reply data of the provisional color grading apparatus 300 responding to the transmission request of the CDL parameter information from the camera 100 in step S603 or S610 in FIG. 6. If the CDL parameter information can be received until the end of the photographing and recording, the CDL parameter information can be recorded in the header portion of the clip as shown in step S607 in FIG. 6. However, if the CDL parameter information is received after the photographing and recording are stopped, the processing in this step is executed.

In step S621, the system control unit 50 discriminates whether or not a clip showing "not obtained" of the CDL parameter information exists in the CDL management information (FIG. 8) for every clip. If the clip not having obtained the CDL parameter information exists, the system control unit 50 advances to step S622. If the clip not having obtained the CDL parameter information does not exist, step S624 follows.

In step S622, the system control unit 50 allows the CDL parameter information obtained in step S620 to be related to the clip which is not obtained and advances to step S623. In the example of FIG. 8, the CDL parameter information obtained in step S620 is made to be related to the clips having the clip IDs of 0004, 0005, and 0006.

In step S623, the system control unit 50 records the CDL parameter information as meta data into the header portion of each of the clips to which the CDL parameter information is newly related in step S622 and advances to step S624.

In step S624, the system control unit 50 holds the obtained CDL parameter information into the system memory 125 as CDL parameter information which is made to be related to the clip that is subsequently photographed, and finishes the processing.

Subsequently, a processing which is executed between the camera 100 and the provisional color grading apparatus 300 in the case where the CDL parameter information can be obtained from the provisional color grading apparatus 300 during the photographing by the camera 100 will be described with reference to FIG. 11.

Figure 11:
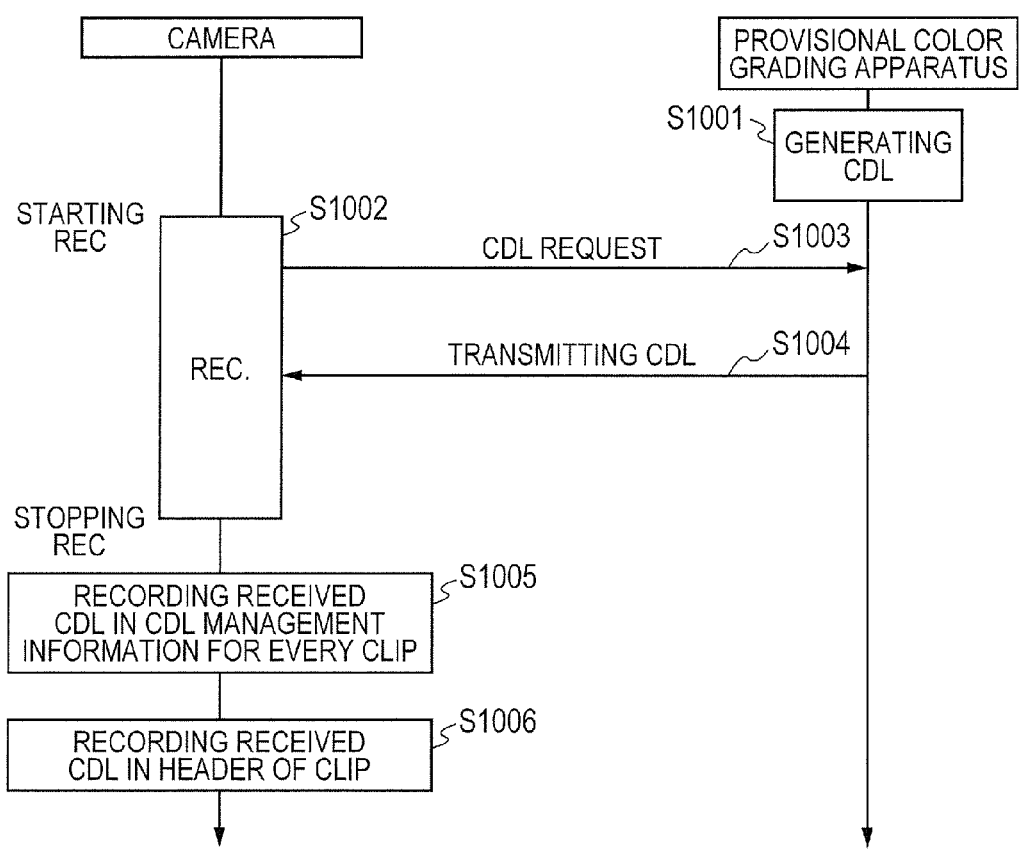
FIG. 11 is a sequence diagram for describing a processing which is executed between the digital video camera and the provisional color grading apparatus in the case where the CDL parameter information can be obtained from the provisional color grading apparatus during the photographing by the digital video camera.

In FIG. 11, in step S1001, the system control unit 350 of the provisional color grading apparatus 300 generates CDL parameter information in accordance with the operation by the user to the operation unit 320.

In step S1002, when the recording start input of the photographed image in the operation unit 120 by the user operation is received, the system control unit 50 of the camera 100 starts the recording operation of the photographed image. The processing mentioned here corresponds to step S602 in FIG. 6.

In step S1003, the system control unit 50 of the camera 100 requests the provisional color grading apparatus 300 through the communication unit 126 so as to transmit the CDL parameter information. The processing mentioned here corresponds to step S603 in FIG. 6.

In step S1004, the system control unit 350 of the provisional color grading apparatus 300 transmits the CDL parameter information generated in step S1001 to the camera 100 through the communication unit 326.

In step S1005, when the recording stop input in the operation unit 120 by the user operation is received, the system control unit 50 of the camera 100 stops the recording operation of the photographed image. The system control unit 50 allocates a clip ID to the photographed image and records the received CDL parameter information and the clip ID into the CDL management information for every clip in relation to each other. The processing mentioned here corresponds to steps S604 and S606 in FIG. 6.

In step S1006, the system control unit 50 of the camera 100 records the received CDL parameter information into the header portion of the clip. The processing mentioned here corresponds to step S607 in FIG. 6.

A processing which is executed between the camera 100 and the provisional color grading apparatus 300 on the way of generation of the CDL parameter information in the case where the transmission request of the CDL parameter information is transmitted from the camera 100 to the provisional color grading apparatus 300 will now be described with reference to FIG. 12.

Figure 12:
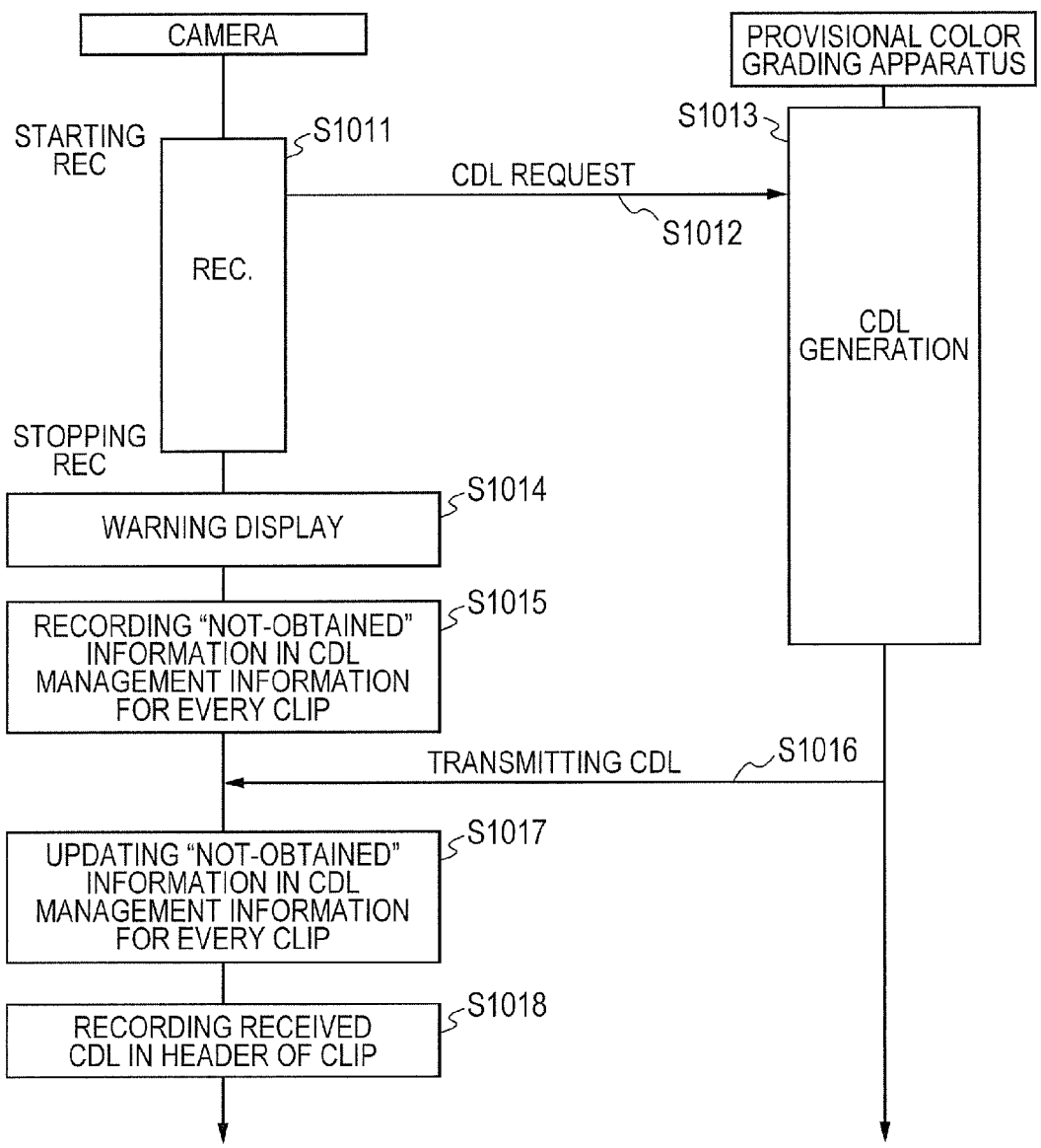
FIG. 12 is a sequence diagram for describing a processing which is executed between the camera and the provisional color grading apparatus on the way of generation of the parameter information in the case where a transmission request of the CDL parameter information is transmitted from the digital video camera to the provisional color grading apparatus.

In FIG. 12, in step S1011, when the recording start input of the photographed image in the operation unit 120 by the user operation is received, the system control unit 50 of the camera 100 starts the recording operation of the photographed image. The processing mentioned here corresponds to step S602 in FIG. 6.

In step S1012, the system control unit 50 of the camera 100 requests the provisional color grading apparatus 300 through the communication unit 126 so as to transmit the CDL parameter information. The processing mentioned here corresponds to step S603 in FIG. 6.

In step S1013, the system control unit 350 of the provisional color grading apparatus 300 generates CDL parameter information in accordance with the operation by the user to the operation unit 320. However, the photographing by the camera 100 is stopped before the generation is completed.

In step S1014, the system control unit 50 of the camera 100 performs a warning display to notify the user that the CDL parameter information is not obtained yet from the provisional color grading apparatus 300. The processing mentioned here corresponds to step S608 in FIG. 6.

In step S1015, since the CDL parameter information to be related to the clip is not obtained yet from the provisional color grading apparatus 300, the system control unit 50 of the camera 100 records information showing that the CDL parameter information is "not obtained" yet for every clip. The processing mentioned here corresponds to step S609 in FIG. 6.

In step S1016, when the provisional color grading processing is completed and the generation of the CDL parameter information is completed, the system control unit 350 of the provisional color grading apparatus 300 transmits the CDL parameter information to the camera 100 through the communication unit 326.

In step S1017, when the CDL parameter information is received, the system control unit 50 of the camera 100 updates the CDL management information (FIG. 8) for every clip. Specifically speaking, the system control unit 50 of the camera 100 records the received CDL parameter information in relation to the clip in which the CDL parameter information of the CDL management information is "not obtained" yet for every clip. The processing mentioned here corresponds to step S622 in FIG. 6.

In step S1018, the system control unit 50 of the camera 100 reads the clip to which the CDL parameter information is newly related in step S1017 and records the CDL parameter information as meta data into the header portion of the clip. The processing mentioned here corresponds to step S623 in FIG. 6.

As described above, in the embodiment, at the timing when the camera 100 starts the recording operation of the photographed image, the transmission request of the CDL parameter information is transmitted to the provisional color grading apparatus 300 and the received CDL parameter information is recorded in relation to the photographed image. Thus, the CDL parameter information generated by the external provisional color grading apparatus 300 of the camera 100 and the image photographed by the camera 100 can be recorded in appropriate relation to each other.

Although the embodiment is described with respect to the case where the color tone and gamma are adjusted on the basis of the ACES standard as an example, if common gamma curve and color space are used between the camera 100 and the provisional color grading apparatus 300, a standard other than the ACES standard may be used. For example, the gamma curve may be adjusted by using the standard of Cineon and the color space may be adjusted by using the standard of DCI or the like.

Although the embodiment has been described with respect to the case where the timing when the recording operation of the photographed image is started is detected and the transmission request of the CDL parameter information is transmitted to the provisional color grading apparatus 300 as an example, the invention is not limited to it.

For example, the timing when the operation regarding the image pickup or reproduction, the operation to determine an image angle of the photographed image, or the operation to adjust an amount of light which enters is performed to the camera 100 may be detected and the transmission request may be transmitted. Specifically speaking, for example, the transmission request of the CDL parameter information can be also transmitted to the provisional color grading apparatus 300 at a stage when the user determines that the photographing preparation is made such as point of time when the change in iris of the lens or the like by the user is completed, point of time when the change in sensitivity setting is completed, or the like. On the other hand, since there is also a case where the image is reproduced after the photographing and the provisional color grading is performed, the transmission request of the CDL parameter information can be also transmitted to the provisional color grading apparatus 300 during the reproduction or after completion of the reproduction.

Although the embodiment has been described with respect to the case where the transmission request of the CDL parameter information is transmitted to the provisional color grading apparatus 300 only once at the point of time when the recording of the photographed image is started as an example, the transmission request may be transmitted a plurality of number of times on the basis of the operation to the camera 100. For example, after the camera 100 finishes the recording of the photographed image, if the CDL parameter information is not obtained yet, the transmission request may be periodically transmitted to the provisional color grading apparatus 300.

Although the embodiment is described with respect to the case where the information of the CDL format is used as parameter information of the color grading as an example, for instance, it is also possible to construct in such a manner that the color grading parameters are transmitted and received in a format of LUT of 1D or 3D.

Although the embodiment is described with respect to the case where the CDL parameter information is recorded as meta data into the header portion of the clip of the photographed image as an example, the invention is not limited to it but can be also applied to any construction so long as the clip and the CDL parameter information are related to each other. For example, link information to the CDL parameter information may be recorded as meta data or an ID may be issued to the CDL parameter information and the ID may be recorded as meta data.

Although the embodiment is described with respect to the case where the clip of the photographed image is recorded into the recording medium 112 of the camera 100 as an example, the photographed image data can be also recorded into a recording medium of an external apparatus. In this case, although such an operation as shown in step S622 in FIG. 6 that the meta data of the clip in which the CDL parameter information is "not obtained" yet is updated in the camera 100 cannot be performed, updating information of the CDL parameter information is transmitted to the external apparatus and the meta data can be also updated in the external apparatus.

Second Embodiment

Subsequently, an image processing system having a digital video camera according to the second embodiment of the image pickup apparatus of the invention will be described with reference to FIGS. 13 to 16. In the second embodiment, overlapped portions or portions corresponding to those in the foregoing first embodiment are designated by the same reference numerals and will be described by also referring to the same diagrams as those used in the first embodiment.

In the present embodiment, a discrimination ID is allocated to the CDL parameter information of the provisional color grading and is managed.

Figure 13:
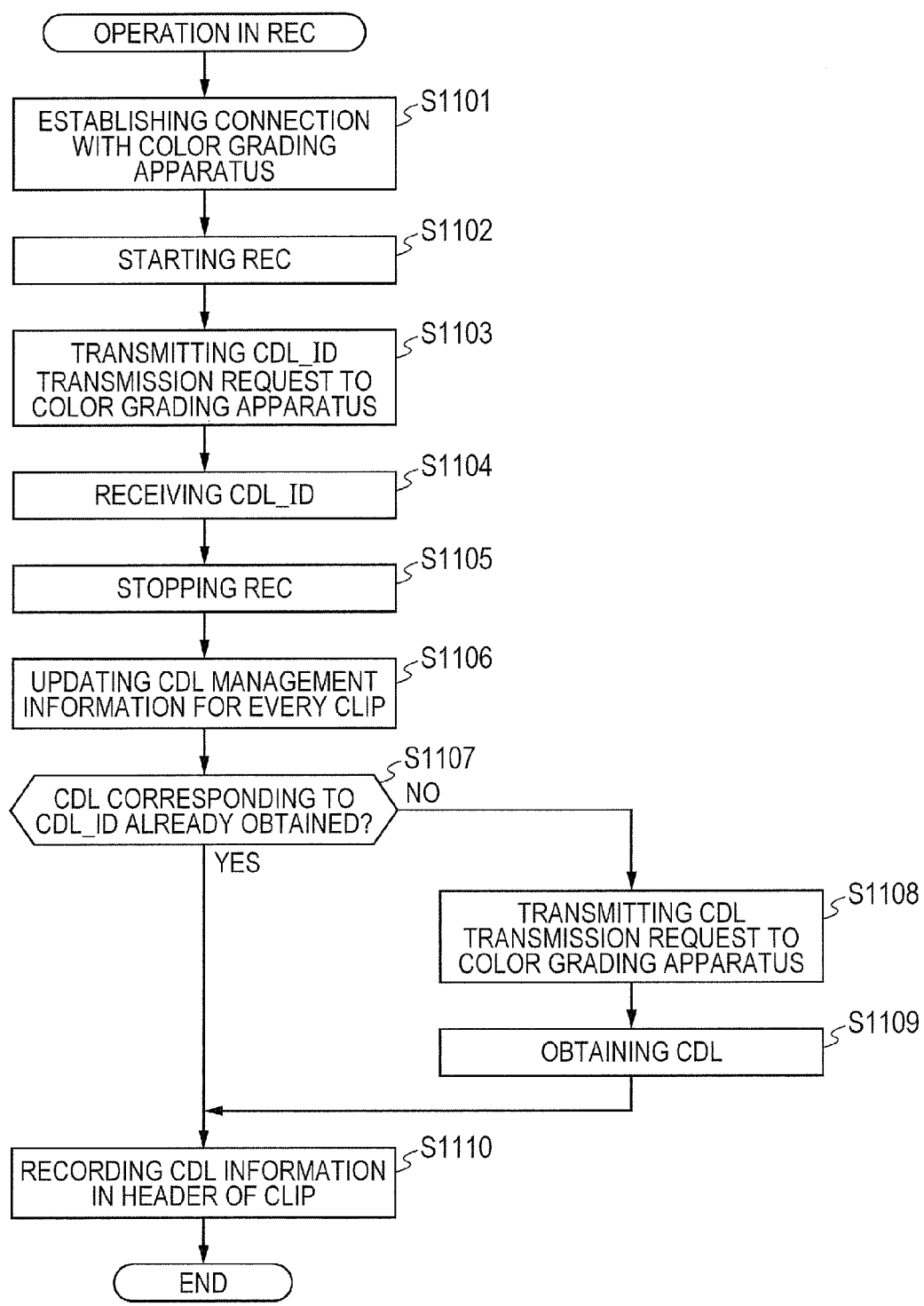
FIG. 13 is a flowchart for describing an example of the operation which is executed for a period of time within a range from the activation of the power source to the recording of the photographed image in the digital video camera in an image processing system having a digital video camera according to the second embodiment of the image pickup apparatus of the invention.

First, the operation on the camera 100 side will be described with reference to FIG. 13. FIG. 13 is a flowchart for describing an example of the operation which is executed for a period of time from the activation of the power source to the recording of the photographed image in the camera 100. Each processing in FIG. 13 is executed by a method whereby the program or the like stored in the nonvolatile memory 123 in the camera 100 is developed in the system memory 125 and is executed by the system control unit 50.

In FIG. 13, in step S1101, when the power supply switch 121 is turned on by the user operation and the camera 100 is activated, the system control unit 50 starts communication so as to establish communication with the provisional color grading apparatus 300 through the communication unit 126. The system control unit 50 outputs the photographed image signals (ACES_RGB image signals after the gamma processing) to the provisional color grading apparatus 300 through the external output I/F 113, and advances to step S1102.

In step S1102, when the recording start input of the photographed image in the operation unit 120 by the user operation is received, the system control unit 50 starts the recording operation of the photographed image and advances to step S1103.

In step S1103, the system control unit 50 requests the provisional color grading apparatus 300 through the communication unit 126 so as to transmit the ID information of the parameters of the color grading, and advances to step S1104. Also in the embodiment, although the parameters of the color grading use the information of the CDL format in a manner similar to the first embodiment, the information, transmission of which is requested in this step, is CDL_ID as ID information which specifies the CDL parameter information. As will be described hereinafter, the provisional color grading apparatus 300 allocates the ID to the generated CDL parameter information or CDL parameter information which will be generated from now on and transmits the ID information as CDL_ID to the camera 100.

In step S1104, the system control unit 50 receives CDL_ID from the provisional color grading apparatus 300 through the communication unit 126 and advances to step S1105.

In step S1105, when the recording stop input in the operation unit 120 by the user operation is received, the system control unit 50 stops the recording operation of the photographed image and advances to step S1106.

In step S1106, the system control unit 50 updates the CDL management information for every clip and advances to step S1107.

FIG. 14A is a diagram illustrating an example of the CDL management information for every clip. In FIG. 14A, the clip ID of the photographed image, recording of which is started in step S1102, and CDL_ID received in step S1104 are managed in relation to each other. That is, each time the photographed image is newly recorded, CDL_ID is recorded into the system memory 125 in relation to its clip. The camera 100 receives the CDL parameter information corresponding to CDL_ID at the timing when CDL_ID is received from the provisional color grading apparatus 300 or the timing after CDL_ID is received.

FIG. 14B is a diagram illustrating an example of the management information of CDL_ID. As illustrated in FIG. 14B, the system control unit 50 records the data of the obtained CDL parameter information and CDL_ID into the system memory 125 in relation to each other. If the data of the CDL parameter information corresponding to CDL_ID is not obtained yet, a flag showing "not obtained" is turned on and managed. In the example of FIG. 14B, the CDL parameter information corresponding to CDL_ID of 004 is not obtained yet.

In step S1107, the system control unit 50 discriminates whether or not the CDL parameter information corresponding to CDL_ID obtained in step S1104 is obtained. If the CDL parameter information corresponding to CDL_ID obtained in step S1104 is obtained, the system control unit 50 advances to step S1110. If it is not obtained, step S1108 follows.

In step S1108, the system control unit 50 transmits the transmission request of the CDL parameter information corresponding to CDL_ID obtained in step S1104 to the provisional color grading apparatus 300 and advances to step S1109.

In step S1109, the system control unit 50 obtains the CDL parameter information corresponding to CDL_ID obtained in step S1104, from the provisional color grading apparatus 300. The system control unit 50 updates the CDL_ID management information shown in FIG. 14B on the basis of the obtained CDL parameter information. That is, the CDL parameter information corresponding to CDL_ID obtained from the provisional color grading apparatus 300 is recorded into the system memory 125, and advances to step S1110.

In step S1110, the system control unit 50 records the CDL parameter information obtained in step S1109 into the header portion of the clip of the photographed image as meta data and finishes the processing.

Subsequently, a processing which is executed between the camera 100 and the provisional color grading apparatus 300 in the case where the CDL parameter information can be obtained from the provisional color grading apparatus 300 prior to photographing in the camera 100 will be described with reference to FIG. 15.

Figure 15:
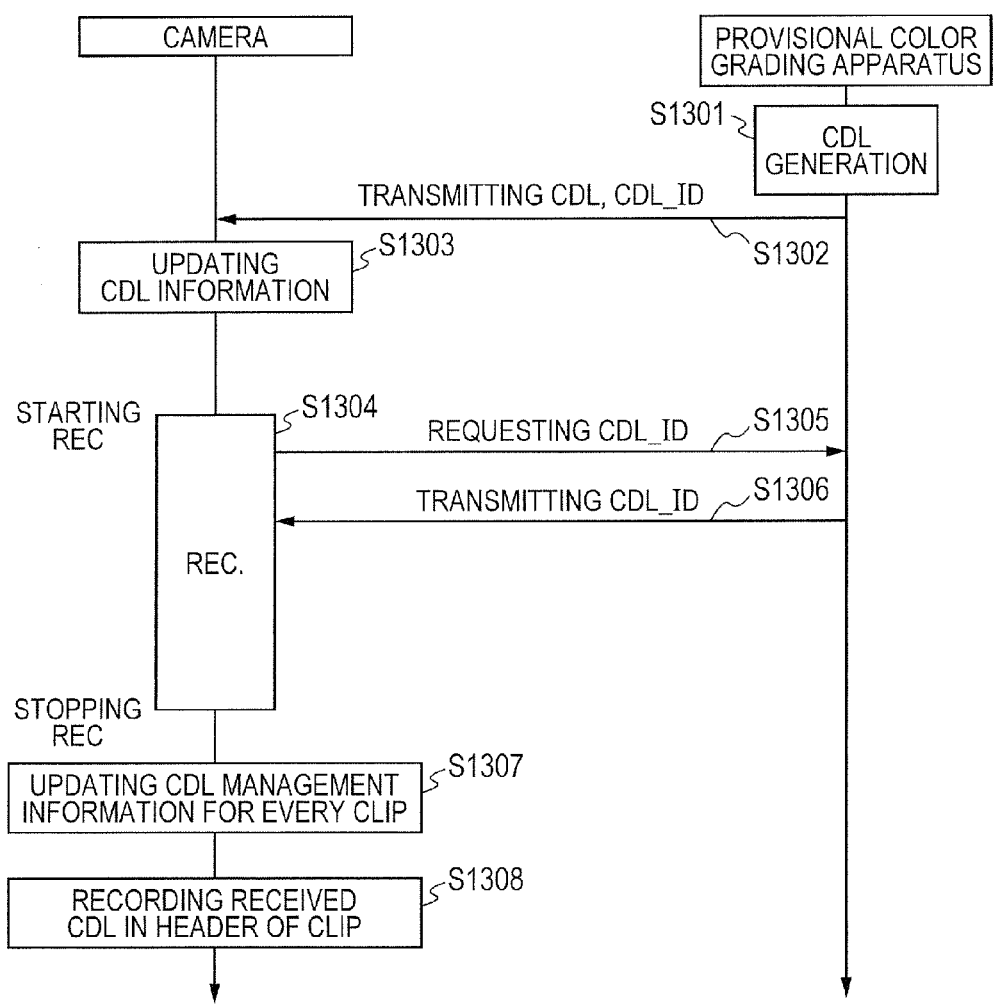
FIG. 15 is a sequence diagram for describing a processing which is executed between the camera and the provisional color grading apparatus in the case where the CDL parameter information can be obtained from the provisional color grading apparatus prior to photographing in the digital video camera.

In FIG. 15, in step S1301, the system control unit 350 of the provisional color grading apparatus 300 generates CDL parameter information in accordance with the operation by the user to the operation unit 320, and allocates CDL_ID to the generated CDL parameter information.

In step S1302, the system control unit 350 of the provisional color grading apparatus 300 transmits the generated CDL parameter information and CDL_ID to the camera 100 through the communication unit 326.

In step S1303, the system control unit 50 of the camera 100 updates the management information of CDL_ID shown in FIG. 14B on the basis of the received CDL_ID and CDL parameter information. The processings of steps S1301 to S1303 may be executed a plurality of number of times prior to execution of step S1304. In this case, the system control unit 50 of the camera 100 records a plurality of sets of CDL_ID and CDL parameter information as CDL_ID management information.

In step S1304, when the recording start input of the photographed image in the operation unit 120 by the user operation is received, the system control unit 50 of the camera 100 starts the recording operation of the photographed image.

In step S1305, the system control unit 50 of the camera 100 transmits the transmission request of CDL_ID to the provisional color grading apparatus 300 through the communication unit 126.

In step S1306, the system control unit 350 of the provisional color grading apparatus 300 transmits CDL_ID applied to the image which is transmitted from the current camera 100 to the camera 100 through the communication unit 326.

In step S1307, when the recording of the photographed image is completed, the system control unit 50 of the camera 100 updates the CDL management information (FIG. 14A) for every clip. That is, the system control unit 50 records the clip of the photographed image and CDL_ID into the system memory 125 in relation to each other.

In step S1308, the system control unit 50 of the camera 100 records the received CDL parameter information as meta data into the header portion of the clip of the photographed image.

A processing which is executed between the camera 100 and the provisional color grading apparatus 300 on the way of generation of the CDL parameter information in the case where the transmission request of CDL_ID is transmitted from the camera 100 to the provisional color grading apparatus 300 will be described with reference to FIG. 16.

Figure 16:
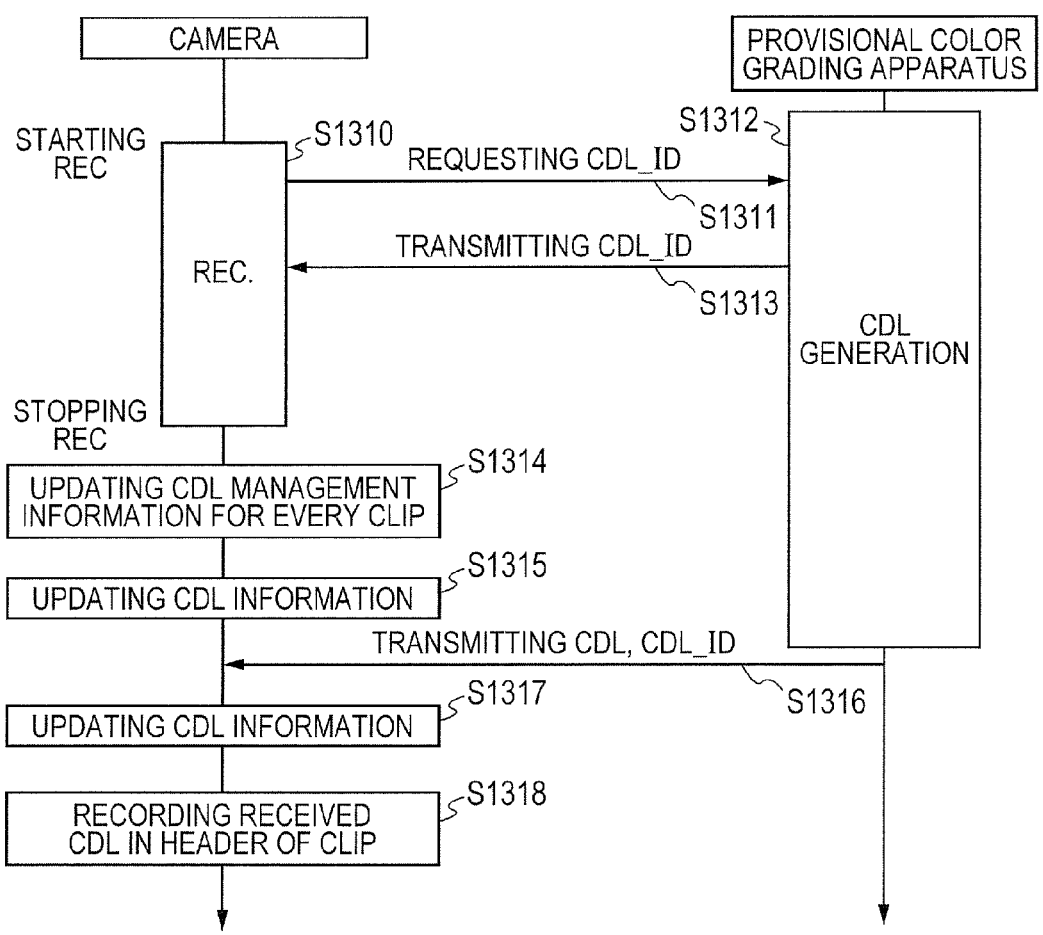
FIG. 16 is a sequence diagram for describing a processing which is executed between the camera and the provisional color grading apparatus on the way of generation of the CDL parameter information in the case where a transmission request of CDL_ID is transmitted from the digital video camera to the provisional color grading apparatus.

In FIG. 16, in step S1310, when the recording start input of the photographed image in the operation unit 120 by the user operation is received, the system control unit 50 of the camera 100 starts the recording operation of the photographed image.

In step S1311, the system control unit 50 of the camera 100 transmits the transmission request of CDL_ID to the provisional color grading apparatus 300 through the communication unit 126.

In step S1312, the system control unit 350 of the provisional color grading apparatus 300 generates CDL parameter information corresponding to the user operation. At this time, the system control unit 350 allocates CDL_ID to the CDL parameter information which is being generated at a stage when CDL parameter information is started to be newly generated.

In step S1313, when the transmission request of CDL_ID is received from the camera 100, the system control unit 350 of the provisional color grading apparatus 300 transmits CDL_ID of the CDL parameter information which is being currently generated to the camera 100 through the communication unit 326.

In step S1314, when the recording of the photographed image is completed, the system control unit 50 of the camera 100 updates the CDL management information (FIG. 14A) for every clip. That is, the system control unit 50 records the clip of the photographed image and CDL_ID in relation to each other.

In step S1315, the system control unit 50 of the camera 100 updates the CDL_ID management information (FIG. 14B). Specifically speaking, to CDL_ID received from the provisional color grading apparatus 300, the system control unit 50 records a flag of "not obtained" of the CDL parameter information into the CDL_ID management information.

In step S1316, when the generation of the CDL parameter information is completed, the system control unit 350 of the provisional color grading apparatus 300 transmits the CDL parameter information and CDL_ID to the camera 100 through the communication unit 326.

In step S1317, the system control unit 50 of the camera 100 updates the CDL_ID management information (FIG. 14B). Specifically speaking, to CDL_ID received from the provisional color grading apparatus 300, the system control unit 50 records the received CDL parameter information into the CDL_ID management information.

In step S1318, the system control unit 50 of the camera 100 records the received CDL parameter information as meta data into the header portion of the clip of the photographed image related to CDL_ID received from the provisional color grading apparatus 300. That is, the received CDL parameter information is recorded into the header portion of the clip in which the meta data cannot be recorded because the CDL parameter information is "not obtained" yet.

As described above, in the embodiment, the ID is allocated to the CDL parameter information of the provisional color grading and the transmission request of CDL_ID is transmitted from the camera 100 to the provisional color grading apparatus 300. By using CDL_ID in this manner, at the timing when the photographing is completed in the camera 100, even if the provisional color grading processing is not completed, the CDL parameter information can be made to be accurately related to the clip of the photographed image later. Other construction and working effects are similar to those in the first embodiment mentioned above.

Although the transmission request of CDL_ID is transmitted from the camera 100 to the provisional color grading apparatus 300 at the time of recording of the photographed image in the embodiment, the transmission request of CDL_ID may be transmitted at the stage when the operation regarding the photographing or reproduction is executed by the user.

During the reproduction or after the reproduction of the photographed image, such control that the transmission request of CDL_ID is transmitted from the camera 100 to the provisional color grading apparatus 300 may be performed. In this case, when CDL_ID obtained at the time of recording of the photographed image and CDL_ID obtained at the time of reproduction differ, the CDL parameter information is recorded into the header portion of the clip of the photographed image corresponding to CDL_ID obtained at the time of reproduction.

Third Embodiment

Subsequently, an image processing system having a digital video camera according to the third embodiment of the image pickup apparatus of the invention will be described with reference to FIG. 17. In the third embodiment, overlapped portions or portions corresponding to those in the foregoing first embodiment are designated by the same reference numerals and will be described by referring to the same diagrams used in the foregoing first embodiment.

In the present embodiment, only when information showing a photographing state of the camera 100 changes, the transmission request is transmitted from the camera 100 to the provisional color grading apparatus 300. In the foregoing first embodiment, if the CDL parameter information is not obtained yet after the photographing, the photographed image 900 and the warning image 901 are displayed on the external monitor 200. On the other hand, in the present embodiment, even in a state where the CDL parameter information is not obtained yet after the photographing, if the photographing state in the camera 100 is not largely changed, such control that the CDL parameter information related to the clip which is photographed at the immediately preceding time is recorded as meta data is performed.

Figure 17:
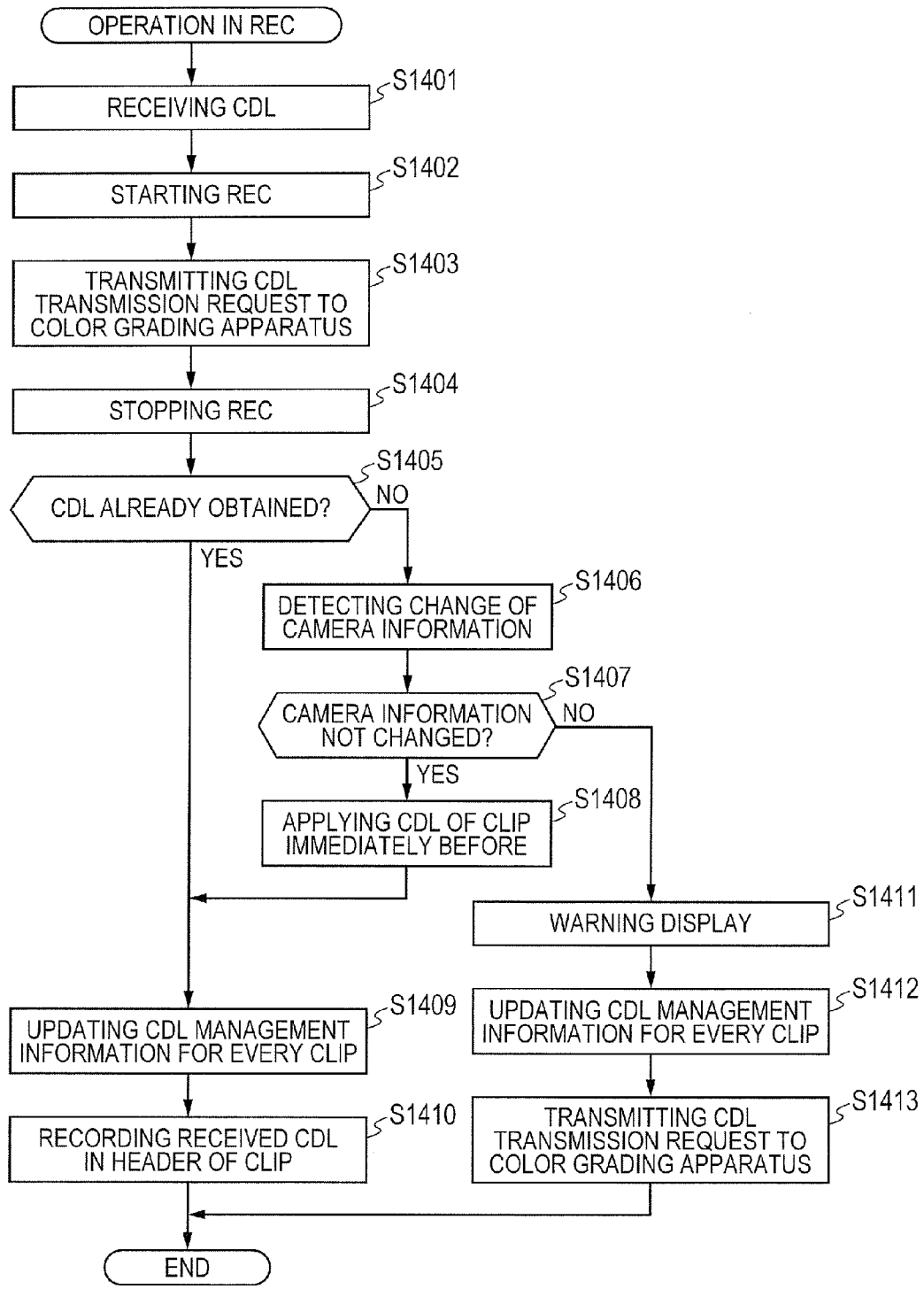
FIG. 17 is a flowchart for describing an example of the operation upon recording of a photographed image after the second time of the digital video camera in an image processing system having a digital video camera according to the third embodiment of the image pickup apparatus of the invention.

FIG. 17 is a flowchart for describing an example of the operation upon recording of the photographed image after the second time of the camera 100. As for the operation upon recording of the photographed image at the first time of the camera 100, a processing similar to that in FIG. 6 is executed. Each processing in FIG. 17 is executed by a method whereby the program or the like stored in the nonvolatile memory 123 in the camera 100 is developed in the system memory 125 and is executed by the system control unit 50.

In FIG. 17, in step S1401, the system control unit 50 receives the CDL parameter information from the provisional color grading apparatus 300 through the communication unit 126 and advances to step S1402. In this instance, the photographing of the first time is previously performed and the CDL parameter information is received by control similar to that in step S620 in FIG. 6 in the first embodiment mentioned above.

In step S1402, when the recording start input of the photographed image in the operation unit 120 by the user operation is received, the system control unit 50 starts the recording operation of the photographed image and advances to step S1403.

In step S1403, the system control unit 50 transmits the transmission request of the CDL parameter information to the provisional color grading apparatus 300 through the communication unit 126 and advances to step S1404.

In step S1404, when the recording stop input of the photographed image in the operation unit 120 by the user operation is received, the system control unit 50 stops the recording operation of the photographed image and advances to step S1405.

In step S1405, the system control unit 50 discriminates whether or not the CDL parameter information is obtained from the provisional color grading apparatus 300 at a point of time of the stop of the recording operation of the photographed image. If the CDL parameter information is obtained, the system control unit 50 advances to step S1409. If it is not obtained yet, S1406 follows.

In step S1406, the system control unit 50 detects a change in photographing state information by comparing photographing state information in the photographed image which is recorded upon photographing of the immediately preceding time with photographing state information in the currently photographed image which is recorded in step S1402. The system control unit 50 functions as an example of a change detection unit in the invention. In the embodiment, an average brightness of the photographed image is used as photographing state information and the system control unit 50 calculates a difference between data of the average brightness of the present photographed image and data of the average brightness of the photographed image of the immediately preceding time and advances to step S1407.

In step S1407, if the difference of the average brightness of the photographed images exceeds a predetermined threshold value, the system control unit 50 determines that there is a change in photographing state information, and step S1411 follows. If the difference is equal to or less than the predetermined threshold value, the system control unit 50 determines that there is no change in photographing state information, and step S1408 follows.

In step S1408, since there is no change in photographing state information of the camera 100, the system control unit 50 applies the CDL parameter information obtained upon photographing of the immediately preceding time to the clip of the currently photographed image and advances to step S1409.

In step S1409, the system control unit 50 records the ID of the clip of the photographed image and the CDL parameter information in relation to each other in the CDL management information (FIG. 8) for every clip and advances to step S1410.

In step S1410, the system control unit 50 records the CDL parameter information which is made to correspond to the ID of the clip as meta data into the header portion of the clip of the photographed image, and finishes the processing.

In step S1411, in a manner similar to step S608 in FIG. 6, the system control unit 50 performs a warning display to notify the user that the CDL parameter information is not obtained yet from the provisional color grading apparatus 300, and advances to step S1412.

In step S1412, in a manner similar to step S609 in FIG. 6, the system control unit 50 updates the CDL management information (FIG. 8) for every clip and advances to step S1413. As for the processing here, as mentioned above, since the CDL parameter information to be related to the clip is not obtained yet, information showing that the CDL parameter information is "not obtained" yet is recorded in the CDL management information like in a case where the IDs of the clips shown in FIG. 8 are equal to 0004, 0005, and 0006.

In step S1413, in a manner similar to step S610 in FIG. 6, the system control unit 50 transmits again the transmission request of the CDL parameter information to the provisional color grading apparatus 300 through the communication unit 126 and finishes the processing.

As described above, in the embodiment, even in the case where the CDL parameter information is not obtained yet, if the photographing state in the camera 100 is not largely changed, such control that the CDL parameter information related to the clip which is photographed at the immediately preceding time is used is performed. Thus, even in the case where the CDL parameter information is not obtained yet at the time of photographing, the CDL parameter information applied to the preceding photographed image of a similar object or scene can be made to be related to the currently photographed image. Therefore, such a situation that the user forgets the operation to make the CDL parameter information be related to the photographed image can be prevented. Other construction and working effects are similar to those in the first embodiment mentioned above.

Although the embodiment is described with respect to the case where the average value of the brightness of the photographed images is used as photographing state information of the camera 100 as an example, any information may be used so long as it is information showing an object, a composition, or a feature of a photographing parameter of the camera 100, or the like. For example, besides brightness information of the photographed image, color information showing a hue, chroma, and the like, or contour feature information of the object may be used as photographing state information. In addition, an iris of the camera 100, a zoom magnification, information of lenses which are used, position information of the camera 100, attitude information, or the like may be used as photographing state information.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate medium may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray disc (BD)™), a flash memory device, a memory card, and the like.

While the present invention is described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-288034, filed on Dec. 28, 2012, which is hereby incorporated by reference herein in its entirety.

What is claimed is:

1. An image pickup apparatus comprising:
an image sensor for picking up an image of an object;
a storage for storing a photographed image picked up by the image sensor;
an output interface for outputting the photographed image picked up by the image sensor to an external image processing apparatus;
a communication device for transmitting, to the external image processing apparatus, a transmission request of parameter information of an image processing that is performed on the photographed image, the external image processing apparatus setting the parameter information for the photographed image, and for receiving, from the external image processing apparatus, the parameter information that is transmitted from the external image processing apparatus according to the transmission request;
a system control processor and a memory storing a program executable by the system control processor to cause the system control processor to perform the functions of a recording unit, an operation detection unit and a control unit,
the recording unit recording, in the storage, the parameter information received by the communication device in relation to the photographed image, the parameter information being used for performing a same image processing on the photographed image related to the parameter information as an image processing performed on the photographed image by the external image processing apparatus;
the operation detection unit detecting an operation in the image pickup apparatus; and
the control unit controlling the transmission of the transmission request of the parameter information by the communication device,
wherein the control unit controls the communication device so as to transmit the transmission request of the parameter information to the external image processing apparatus when the operation detection unit detects a predetermined operation.

2. An apparatus according to claim 1, the system control processor further performing the functions of an obtaining unit and a determination unit,
the obtaining unit obtaining, from the external image processing apparatus, information for determining whether or not the photographed image which is output from the output interface is input to the external image processing apparatus; and
the determination unit determining whether or not the photographed image is input to the external image processing apparatus on the basis of the information obtained by the obtaining unit,
wherein the control unit controls the communication device so as to transmit the transmission request of the parameter information to the external image processing apparatus when the determination unit determines that the photographed image is input to the external image processing apparatus.

3. An apparatus according to claim 1, wherein the parameter information is parameter information for adjusting a color and a gradation.

4. An apparatus according to claim 1, wherein the operation in the image pickup apparatus, which is detected by the operation detection unit, is an operation regarding the recording of the photographed image.

5. An apparatus according to claim 1, wherein the operation in the image pickup apparatus, which is detected by the operation detection unit, is an operation regarding the reproduction of the photographed image.

6. An apparatus according to claim 1, wherein the operation in the image pickup apparatus, which is detected by the operation detection unit, is an operation to determine an image angle of the photographed image.

7. An apparatus according to claim 1, wherein the operation in the image pickup apparatus, which is detected by the operation detection unit, is an operation to adjust an amount of light which enters the image pickup unit.

8. An apparatus according to claim 1, the system control processor further performing the functions of a warning unit configured to warn a user when the parameter information cannot be received by the communication device after the communication device transmits the transmission request of the parameter information to the external image processing apparatus.

9. An apparatus according to claim 1, wherein the communication device receives numeric information of the parameter information.

10. An apparatus according to claim 9, wherein the recording unit records the parameter information received by the communication device as additional information of the photographed image.

11. An apparatus according to claim 1, wherein the communication device transmits the transmission request of ID information to specify the parameter information to the external image processing apparatus, and
receives the ID information from the external image processing apparatus.

12. An apparatus according to claim 11, wherein the recording unit specifies the parameter information from the ID information received by the communication device and records the specified parameter information as additional information of the photographed image.

13. An apparatus according to claim 1, the system control processor further performing the functions of a change detection unit configured to detect a change between photographing state information of a preceding photographed image and a current photographed image, and wherein when the change detection unit does not detect the change of the photographing state information, the recording unit records the parameter information related to the preceding photographed image as additional information of the current photographed image.

14. An apparatus according to claim 13, wherein the photographing state information is information including one of a state of the photographed object and a state of the operation of the image pickup apparatus.

15. A control method of an image pickup apparatus, comprising:

storing a photographed image in a storage;
outputting the photographed image to an external image processing apparatus;
transmitting, to the external image processing apparatus, a transmission request of parameter information of an image processing that is performed on the photographed image, the external image processing apparatus setting the parameter information for the photographed image;
receiving, from the external image processing apparatus, the parameter information that is transmitted from the external image processing apparatus according to the transmission request;
recording, in the storage, the parameter information received in the reception step in relation to the photographed image, the parameter information being used for performing a same image processing on the photographed image related to the parameter information as an image processing performed on the photographed image by the external image processing apparatus;
detecting an operation in the image pickup apparatus; and
executing a processing for transmitting the transmission request of the parameter information to the external image processing apparatus in the transmission step when the predetermined operation is detected in the operation detection step.

16. A non-transitory computer-readable storage medium storing a program for allowing a computer to execute the steps of:

storing a photographed image in a storage;
outputting a photographed image to an external image processing apparatus;
transmitting, to the external image processing apparatus, a transmission request of parameter information of an image processing that is performed on the photographed image, the external image processing apparatus setting the parameter information for the photographed image;
receiving, from the external image processing apparatus, the parameter information that is transmitted from the external image processing apparatus according to the transmission request;
recording, in the storage, the parameter information received in the reception step in relation to the photographed image, the parameter information being used for performing a same image processing on the photographed image related to the parameter information as an image processing performed on the photographed image by the external image processing apparatus;
detecting an operation in the image pickup apparatus; and
executing a processing for transmitting the transmission request of the parameter information to the external image processing apparatus in the transmission step when the predetermined operation is detected in the operation detection step.

* * * * *